(12) United States Patent
Lin et al.

(10) Patent No.: US 8,306,434 B2
(45) Date of Patent: Nov. 6, 2012

(54) SYSTEM AND METHOD FOR TRANSMITTING SIGNALS

(75) Inventors: Chun Ting Lin, Dadu Township, Taichung County (TW); Wen Jr Jiang, Tucheng (TW); Jyehong Chen, Zhubei (TW); Sien Chi, Hsinchu (TW); Dar Zu Hsu, Xigang Township, Tainan County (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 247 days.

(21) Appl. No.: 12/760,955

(22) Filed: Apr. 15, 2010

(65) Prior Publication Data

US 2011/0170876 A1 Jul. 14, 2011

(30) Foreign Application Priority Data

Jan. 8, 2010 (TW) .............................. 99100344 A

(51) Int. Cl.
*H04B 10/00* (2006.01)
*H04B 10/04* (2006.01)

(52) U.S. Cl. ........ 398/198; 398/159; 398/161; 398/163; 398/183

(58) Field of Classification Search .................. 398/115, 398/158, 159, 161, 163, 183, 185, 188, 198
See application file for complete search history.

(56) References Cited

U.S. PATENT DOCUMENTS 6,525,857 B1 2/2003 Way et al.
7,817,923 B2 * 10/2010 Akiyama et al. .............. 398/188
2002/0063935 A1 * 5/2002 Price et al. .................... 359/180
2010/0189443 A1 * 7/2010 Krause et al. ................. 398/115
2011/0262131 A1 * 10/2011 Gottwald et al. ............... 398/41

OTHER PUBLICATIONS

A.J. Lowery, etc "Experimental demonstrations of 20 Gbit/s direct-detection optical OFDM and 12 Gbit/s with a colorless transmitter", Monash Univ, Australia OFC 2007.
Wei-Ren Peng, etc. "Experimental Demonstration of 1600 km SSMF Transmission of a Generalized Direct Detection Optical Virtual SSB-OFDM System," vol. 1, pp. 57-58, ECOC 2008, Sep. 21-25, 2008, Belgium.

* cited by examiner

*Primary Examiner* — Dalzid Singh
(74) *Attorney, Agent, or Firm* — Egbert Law Offices, PLLC

(57) ABSTRACT

A signal-transmitting system includes a digital-to-analog converter, an optical modulator, first and second electrodes, an optical phase shifter, and an optical coupler. The digital-to-analog converter converts digital data into an electrical analog signal. The optical modulator includes a first optical waveguide configured to transmit a first optical carrier, a second optical waveguide configured to transmit a second optical carrier, a first electrode positioned on the first optical waveguide, and a second electrode positioned on the second optical waveguide. The first and second electrical couplers are configured to couple respective electrical analog signals and electrical carriers to electrodes to generate modulation waves. The modulation waves are different in phase. The optical phase shifter is configured to shift the second modulation wave by a predetermined phase, and the optical coupler is configured to couple the first and second modulation waves to generate an optical output signal.

20 Claims, 9 Drawing Sheets

SYSTEM AND METHOD FOR TRANSMITTING SIGNALS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The disclosure relates to a system and method for transmitting signals, and more particularly, to a system and method for transmitting signals by using a digital-to-analog converter without using the electrical mixer to generate a reference optical carrier such that the ratio of the power between the optical carrier and the signal can be adjusted individually to optimize power efficiency.

2. Description of Related Art Including Information Disclosed Under 37 CFR 1.97 and 37 CFR 1.98

Current wideband transmission technology is improved very quickly. The transmission speed of the very-high-bit-rate Digital Subscriber Line 2 (VDSL2) has reached 100 Mbps, and transmission speeds of the Wireless LAN (WLAN) and the Ultra-Wide Band (UWB) systems have reached 100 Mbps and will rise to 1 Gbps in the near future. Transmission speed is important because electronic devices such as CCTV and medical sensors transmit data via the network, in addition to the PC and cell phone. The optical fiber network possesses advantages such as high stability and ultra wideband and long-distance transmission ability; therefore, it is very suitable for connecting wired or wireless wideband networks to a local terminal. However, the current available architecture of the optical fiber network, Fiber-to-the-x (FTTx) has a bandwidth of only between 1 and 2.5 Gbps, which is not wide enough to transmit the large amounts of data required in the near future.

The conventional transmission system uses the Orthogonal Frequency Division Multiplexing (OFDM) technique to carry signals of 10 Gbps on 2 GHz bandwidth. The 10 Gbps optical transceiver for the FTTx can be implemented by using the multilevel optical modulation technique incorporating the OFDM multi-carrier technique such that a 10 Gbps transmission speed can be achieved by using the low speed laser and PIN. Using the OFDM multi-carrier technique and the Quadrature Amplitude Modulation (QAM) technique to convert the high-speed 10 Gbps series data into multiple parallel channel data carried in a bandwidth between 0.1 and 2 GHz not only decreases the data transmission rate and the occupied bandwidth of each subcarrier to solve the fiber dispersion problem, but also avoids the feedback equalization issue due to using a single carrier. In addition, the OFDM system needs a multiplier for each subcarrier channel, which enables individual gain-adjusting of each subcarrier channel to allow a uniform channel response. Consequently, this system can be applied to the 10 Gbps high-speed circuit.

However, the conventional optical OFDM produces the Inter-Modulation Distortion (IMD) problem at the receiving end. The receiver used in the conventional optical OFDM to convert optical signals into electrical signals has the square effect, which squares the received OFDM signals and generates the subcarrier beat phenomena. The frequency of the beat occurs at the frequency difference between each two of the subcarriers, from baseband to the bandwidth originally occupied by the signals; these beat signals are known as IMD. Since the band of the IMD and that of the OFDM signal overlap, very serious interference and signal errors occur.

The IMD interference could be solved by up-conversing the OFDM signals to a frequency higher than the original bandwidth, which is the band where the IMD occurs. This solution can be explained by the following equation:

$$[m(t)\cos(\omega_C + \omega_{RF})t + \cos\omega_C t]^2 =$$
$$m^2(t)\cos^2(\omega_C + \omega_{RF})t + \cos^2\omega_C t + 2m(t)\cos\omega_C t \times \cos(\omega_C + \omega_{RF})t \approx$$
$$m^2(t) + m(t)\cos\omega_{RF} t + \text{high frequency terms}$$

$m(t)\cos(\omega_C+\omega_{RF})t+\cos\omega_C t$ in the square bracket represents the optically modulated signals at the transmitting end, m(t) represents the signals to be received, w represents the frequency of the optical carrier, and $\omega_{RF}$ represent the frequency after up-conversion at the transmitting end. Since the signals are up-converted to $\omega_{RF}$ at the transmitting end, the frequency of the signals is higher than that of the optical carrier by $\omega_{RF}$ after the optical modulator. At the receiving end, the signals and the optical carrier after the square effect of the receiver generate the square terms from itself and the square terms from one another. The high frequency terms can be filtered, but 2m(t) and m(t)cos $\omega_{RF}$ t (the signal to be received) are retained. Since the m(t) has been up-converted to the frequency of $\omega_{RF}$, which is higher than the band where the IMD occurs, and the IMD interference can be solved.

In summary, the conventional technique uses the electrical mixer to conduct the up-conversion so as to solve the IMD interference; however, the use of the electrical mixer decreases the signal to noise ratio. Another conventional technique for solving the IMD interference uses a portion (high-frequency band) of the digital-to-analog converter (DAC) to transmit the signals, but this technique uses half the bandwidth of the DAC.

BRIEF SUMMARY OF THE INVENTION

One aspect of the disclosure provides a system and method for transmitting signals by using the digital-to-analog converter without using the electrical mixer to generate a reference optical carrier such that the ratio of the power between the optical carrier and the signal can be adjusted individually to optimize power efficiency.

A signal-transmitting system according to this aspect of the disclosure comprises a digital-to-analog converter, an optical modulator, a first electrical coupler, a second electrical coupler, an optical phase shifter, and an optical coupler. In one embodiment of the disclosure, the optical modulator includes a first optical waveguide configured to transmit a first optical carrier, a second optical waveguide configured to transmit a second optical carrier, a first electrode positioned on the first optical waveguide, and a second electrode positioned on the second optical waveguide. In one embodiment of the disclosure, the digital-to-analog converter is configured to convert digital data into an electrical analog signal, the first electrical coupler is configured to couple the electrical analog signal and a first electrical carrier to the first electrode to generate a first modulation wave, the second electrical coupler is configured to couple the electrical analog signal and a second electrical carrier to the second electrode to generate a second modulation wave, the optical phase shifter is configured to shift the second modulation wave by a predetermined phase, and the optical coupler is configured to couple the first modulation wave and the second modulation wave to generate an optical output signal, wherein the phase of the first electrical carrier is different from the phase of the second electrical carrier by a predetermined phase difference.

Another aspect of the disclosure discloses a method for transmitting signals comprising the step of providing an optical modulator including a first optical waveguide configured to transmit a first optical carrier, a second optical waveguide configured to transmit a second optical carrier, a first electrode positioned on the first optical waveguide, and a second electrode positioned on the second optical waveguide. In one embodiment of the disclosure, the method for transmitting signals comprises the steps of converting digital data into an electrical analog signal, coupling the electrical analog signal and a first electrical carrier to the first electrode to generate a first modulation wave, coupling the electrical analog signal and a second electrical carrier to the second electrode to generate a second modulation wave, shifting the second modulation wave by a predetermined phase, and coupling the first modulation wave and the second modulation wave to generate an optical output signal, wherein the phase of the first electrical carrier is different from the phase of the second electrical carrier by a predetermined phase difference.

The foregoing has outlined rather broadly the features and technical advantages of the disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed might be readily utilized as a basis for modifying or designing other structures or processes for carrying out the same purposes of the disclosure. It should also be realized by those skilled in the art that such equivalent constructions do not depart from the spirit and scope of the disclosure as set forth in the appended claims.

BRIEF DESCRIPTION OF THE SEVERAL VIEWS OF THE DRAWINGS

The accompanying drawings, which are incorporated in and constitute a part of this specification, illustrate embodiments of the disclosure and, together with the description, serve to explain the principles of the disclosure.

DETAILED DESCRIPTION OF THE INVENTION

Figure 1:
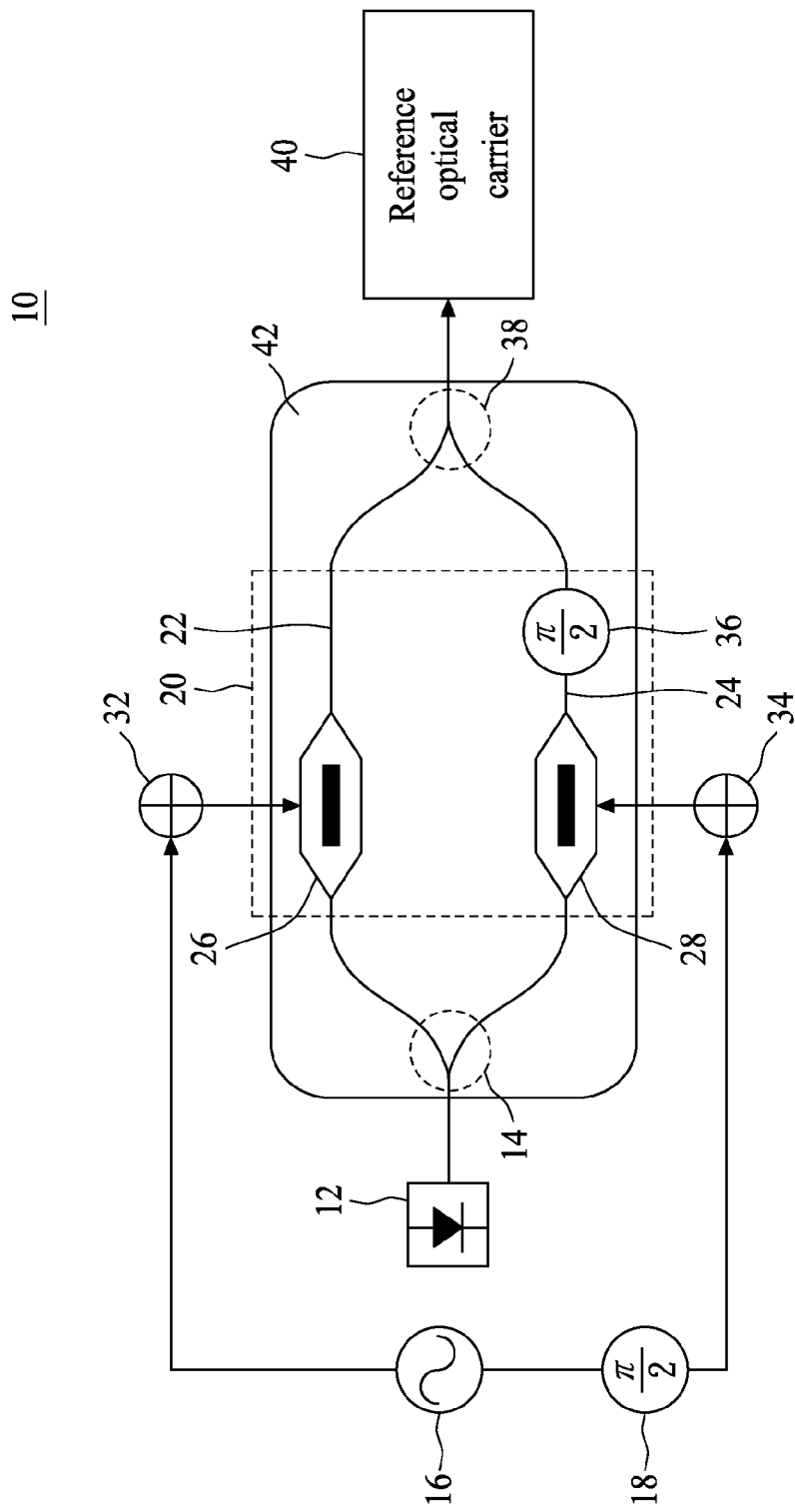
FIG. 1 illustrates a schematic view of an up-conversion apparatus according to one embodiment of the disclosure.

FIG. 1 illustrates an up-conversion apparatus 10 according to one embodiment of the disclosure. The up-conversion apparatus 10 comprises an optical splitter 14, an electrical wave generator 16, an electrical phase shifter 18, an optical modulator 20, a first electrical coupler 32, a second electrical coupler 34, an optical phase shifter 36, and an optical coupler 38. In one embodiment of the disclosure, the up-conversion apparatus 10 further comprises an optical wave generator 12 such as the laser source configured to generate an optical wave, and the optical splitter 14 is configured to split the optical wave into a first optical carrier and a second optical carrier. In one embodiment of the disclosure, the electrical wave generator 16 is configured to generate a first electrical carrier and a second electrical carrier, and the electrical phase shifter 18 is configured to shift the phase of the second electrical wave by 90 degrees.

In one embodiment of the disclosure, the optical modulator 20 includes a first optical waveguide 22 configured to transmit the first optical carrier, a second optical waveguide 24 configured to transmit the second optical carrier, a first electrode 26 positioned on the first optical waveguide 22, and a second electrode 28 positioned on the second optical waveguide 24. In one embodiment of the disclosure, the first electrical coupler 32 is configured to couple the first electrical carrier to the first electrode 26 to generate a first modulation wave by modulating the amplitude/phase of the first optical carrier according to the amplitude/phase of the first electrical carrier, and the second electrical coupler 34 is configured to couple the second electrical carrier to the second electrode 28 to generate a second modulation wave by modulating the amplitude/phase of the second optical carrier according to the amplitude/phase of the second electrical carrier. The phase of the first electrical carrier is different from the phase of the second electrical carrier by a predetermined phase difference such as 90 degrees, the optical phase shifter 36 is configured to shift the second modulation wave by a predetermined phase such as 90 degrees, and the optical coupler 38 is configured to couple the first modulation wave and the second modulation wave to generate a reference carrier 40.

In one embodiment of the disclosure, the optical modulator 20 is a double-sideband modulator including a lithium niobate substrate 42, the optical splitter 14 is a Y-shaped optical waveguide positioned in the substrate 42 and configured to couple the first optical carrier to the first optical waveguide 22 and couple the second optical carrier to the second optical waveguide 24, and the optical coupler 38 is a Y-shaped optical waveguide positioned in the substrate 42 and configured to couple the first modulation wave and the second modulation wave to form the reference carrier 40. In one embodiment of the disclosure, the optical phase shifter 36 is a third electrode positioned on the second optical waveguide to shift the second modulation wave by a predetermined phase such as 90 degrees by applying a predetermined voltage to the third electrode.

Figure 2:
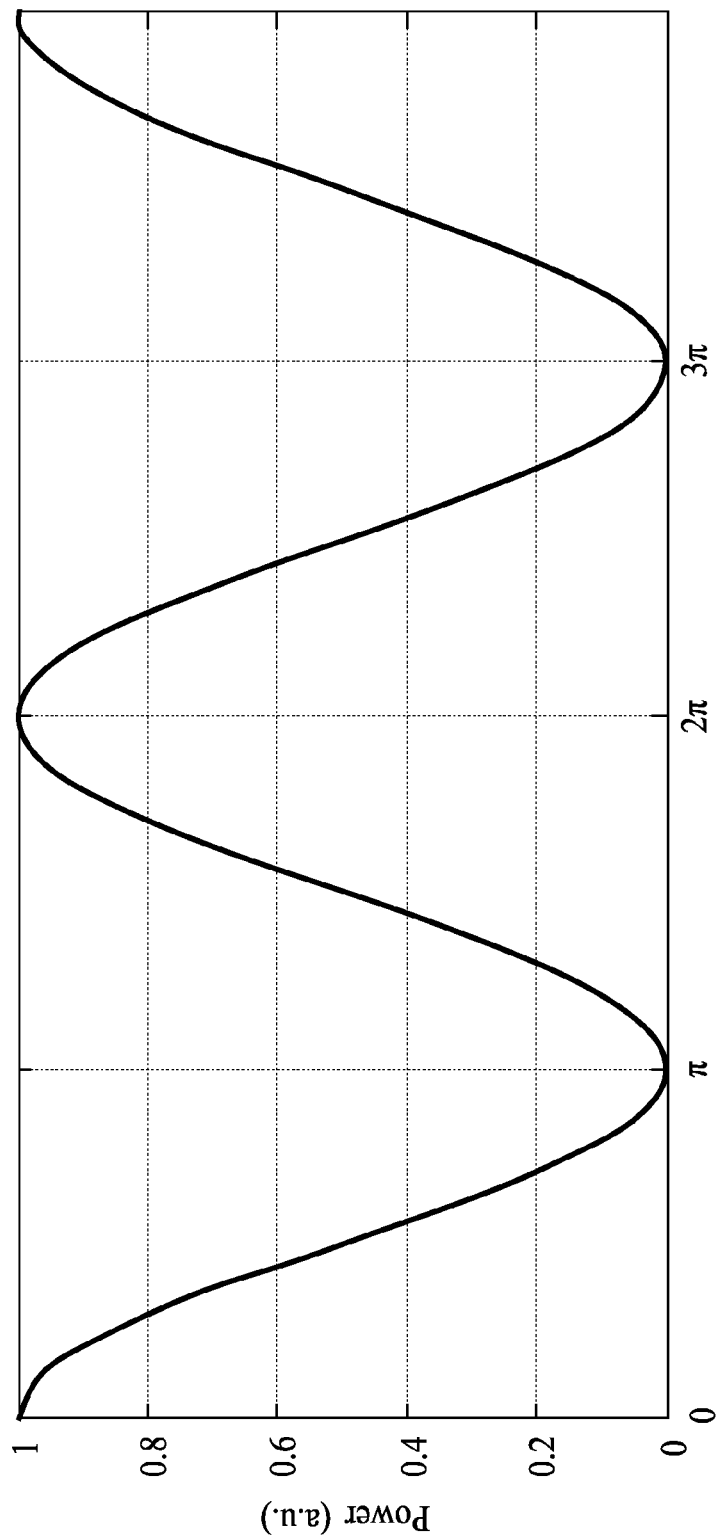
FIG. 2 illustrates a graphical view of a transfer curve of the optical modulator according to one embodiment of the disclosure.

FIG. 2 illustrates a transfer curve of the optical modulator 20 according to one embodiment of the disclosure. Biasing the optical modulator 20 at $V\pi$ (the bottom of the transfer curve) results in elimination of the optical carrier signal; in contrast, biasing the optical modulator 20 at $2V\pi$ (the peak of the transfer curve) results in elimination of all of the odd-order sidebands of the subcarrier signal while the optical carrier and the even-order sidebands of the subcarrier signal remain. The inventor has published a paper that describes the biasing effect on the optical modulator 20 in detail, JOURNAL OF LIGHTWAVE TECHNOLOGY, VOL. 26, NO. 15, AUG. 1, 2008.

Figure 3:
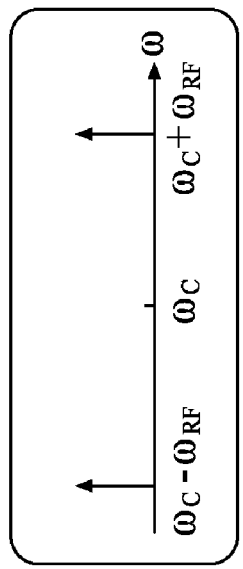
FIG. 3 to FIG. 5 illustrate schematic views of the spectrum variation of the up-conversion apparatus according to one embodiment of the disclosure.
Figure 3:
Figure 3:
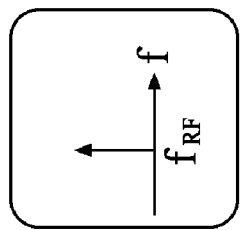
Figure 4:
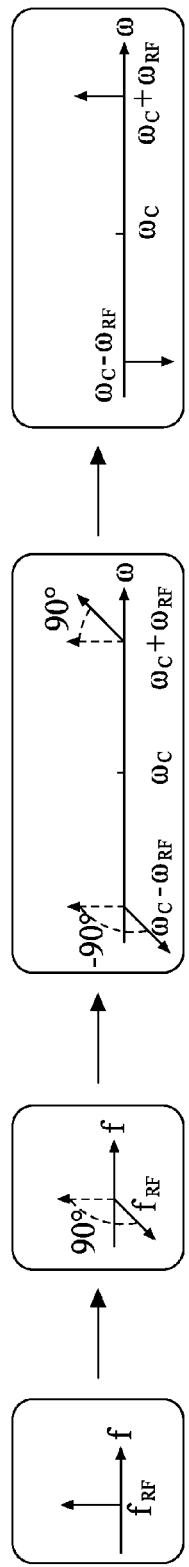
Figure 5:
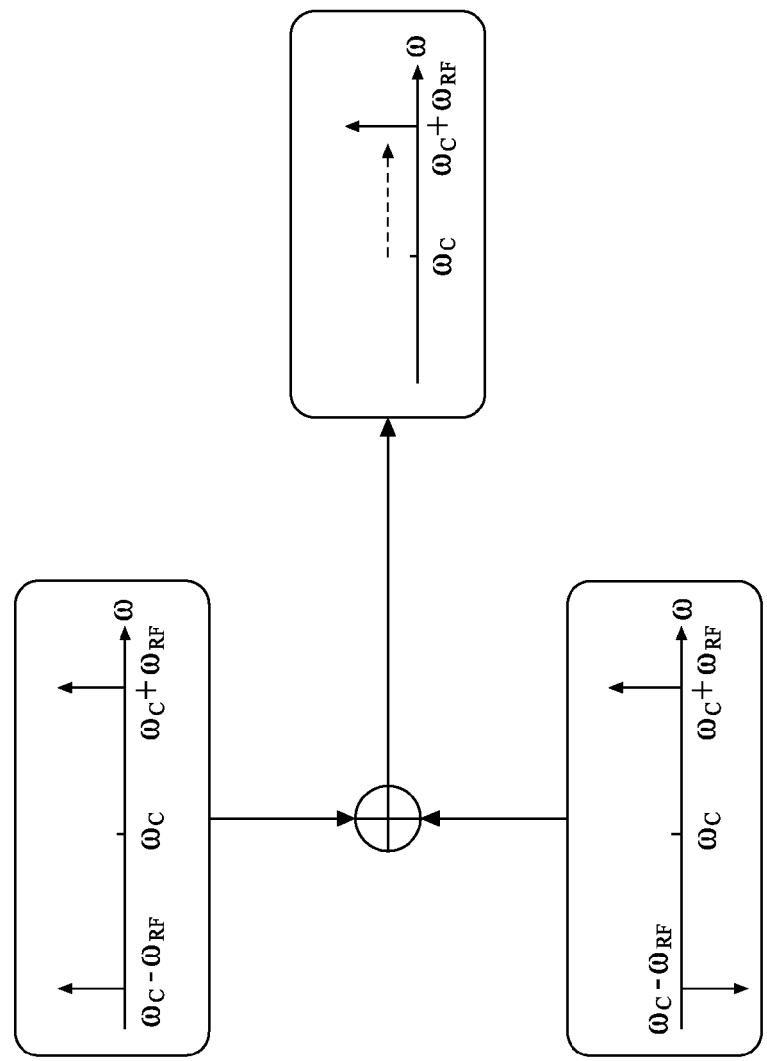

FIG. 3 to FIG. 5 illustrate the spectrum variation of the up-conversion apparatus 10 according to one embodiment of the disclosure. Referring to FIG. 3, in one embodiment of the disclosure, the first electrical carrier ($f_{RF}$) is coupled to the first electrode 26 of the optical modulator 20 by the first electrical coupler 32 to modulate the first optical carrier propagating in the first optical waveguide 22 under the first electrode 26 to form the first modulation wave. In one embodiment of the disclosure, the optical modulator 20 is biased at a predetermined voltage (Vπ) such that the first optical carrier ($\omega_C$) is eliminated while the first electrical carrier ($\omega_{RF}$) is modulated to the two sides from the first optical carrier ($\omega_C$) by a frequency $f_{RF}$, i.e., the first modulation wave including a right sideband ($\omega_C+\omega_{RF}$) and a left sideband ($\omega_C-\omega_{RF}$).

Referring to FIG. 4, in one embodiment of the disclosure, the electrical shifter 18 shifts the phase of the second electrical carrier ($f_{RF}$) by 90 degrees, and the second electrical carrier ($f_{RF}$) is then coupled to the second electrode 28 of the optical modulator 20 by the second electrical coupler 34 to modulate the second optical carrier propagating in the second optical waveguide 24 under the second electrode 28 to form the second modulation wave. In one embodiment of the disclosure, the optical modulator 20 is biased at a predetermined voltage (Vπ) such that the second optical carrier ($\omega_C$) is eliminated while the second electrical carrier ($\omega_{RF}$) is modulated to the two sides from the second optical carrier ($\omega_C$) by a frequency $f_{RF}$, i.e., the second modulation wave including a right sideband ($\omega_C+\omega_{RF}$) and a left sideband ($\omega_C-\omega_{RF}$). Subsequently, in one embodiment of the disclosure, the optical phase shifter 36 shifts the second modulation wave by a predetermined phase such that the left sideband ($\omega_C-\omega_{RF}$) and the right sideband ($\omega_C+\omega_{RF}$) have the opposite phase.

Referring to FIG. 5, in one embodiment of the disclosure, the optical coupler 38 is configured to couple the first modulation wave and the second modulation wave to form the reference optical carrier 40. In one embodiment of the disclosure, the left sideband ($\omega_C-\omega_{RF}$) of the first modulation wave and the left sideband ($\omega_C-\omega_{RF}$) of the second modulation wave have the opposite phase such that the destructive interference occurs and the two left sidebands eliminate each other; in contrast, the right sideband ($\omega_C+\omega_{RF}$) of the first modulation wave and the right sideband ($\omega_C+\omega_{RF}$) of the second modulation wave have the same phase such that the constructive interference occurs to form the reference optical carrier 40. In other words, the up-conversion apparatus 10 increases the frequency of the optical wave generated by the optical wave generator 12 from $\omega_C$ to $\omega_C+\omega_{RF}$.

Figure 6:
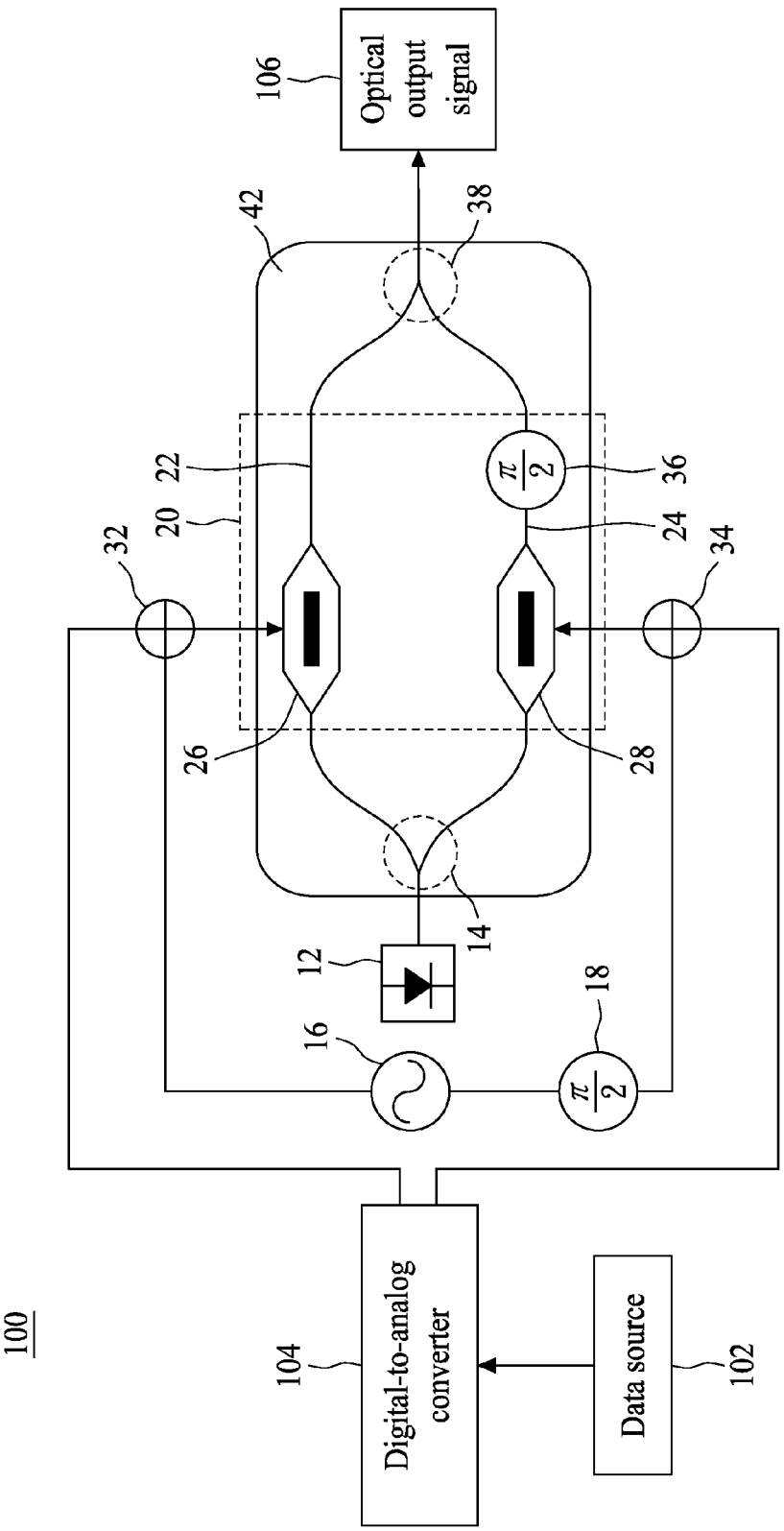
FIG. 6 illustrates a schematic view of a signal-transmitting system according to one embodiment of the disclosure.

FIG. 6 illustrates a signal-transmitting system 100 according to one embodiment of the disclosure. The signal-transmitting system 100 comprises a digital-to-analog converter (DAC) 104, an optical wave generator 12, an optical splitter 14, an electrical wave generator 16, an electrical phase shifter 18, an optical modulator 20, a first electrical coupler 32, a second electrical coupler 34, an optical phase shifter 36, and an optical coupler 38.

In one embodiment of the disclosure, the digital-to-analog converter 104 is configured to convert digital data from a data source 102 into electrical analog signals. In one embodiment of the disclosure, the optical wave generator 12 is configured to generate an optical wave, and the optical splitter 14 is configured to split the optical wave into a first optical carrier and a second optical carrier. In one embodiment of the disclosure, the electrical wave generator 16 is configured to generate a first electrical carrier and a second electrical carrier, and the electrical phase shifter 18 is configured to shift the phase of the second electrical wave by 90 degrees.

In one embodiment of the disclosure, the optical modulator 20 includes a first optical waveguide 22 configured to transmit the first optical carrier, a second optical waveguide 24 configured to transmit the second optical carrier, a first electrode 26 positioned on the first optical waveguide 22, and a second electrode 28 positioned on the second optical waveguide 24. In one embodiment of the disclosure, the first electrical coupler 32 is configured to couple the first electrical carrier to the first electrode 26 to generate a first modulation wave by modulating the amplitude/phase of the first optical carrier according to the amplitude/phase of the first electrical carrier, and the second electrical coupler 34 is configured to couple the second electrical carrier to the second electrode 28 to generate a second modulation wave by modulating the amplitude/phase of the second optical carrier according to the amplitude/phase of the second electrical carrier. The phase of the first electrical carrier is different from the phase of the second electrical carrier by a predetermined phase difference such as 90 degrees, the optical phase shifter 36 is configured to shift the second modulation wave by a predetermined phase such as 90 degrees, and the optical coupler 38 is configured to couple the first modulation wave and the second modulation wave to generate a reference carrier 40.

In one embodiment of the disclosure, the optical modulator 20 is a double-sideband modulator including a lithium niobate substrate 42, the optical splitter 14 is a Y-shaped optical waveguide positioned in the substrate 42 and configured to couple the first optical carrier to the first optical waveguide 22 and couple the second optical carrier to the second optical waveguide 24, and the optical coupler 38 is a Y-shaped optical waveguide positioned in the substrate 42 and configured to couple the first modulation wave and the second modulation wave to form the reference carrier 40. In one embodiment of the disclosure, the optical phase shifter 36 is a third electrode positioned on the second optical waveguide to shift the second modulation wave by a predetermined phase such as 90 degrees by applying a predetermined voltage to the third electrode.

Figure 7:
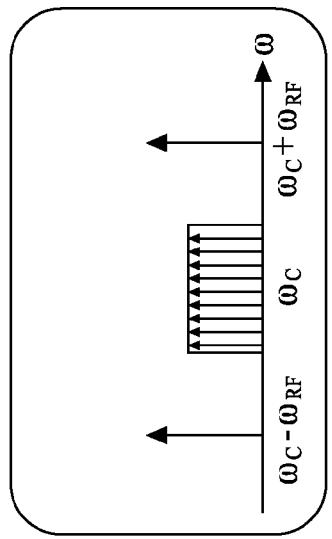
FIG. 7 to FIG. 9 illustrate schematic views of the spectrum variation of the signal-transmitting system according to one embodiment of the disclosure.
Figure 7:
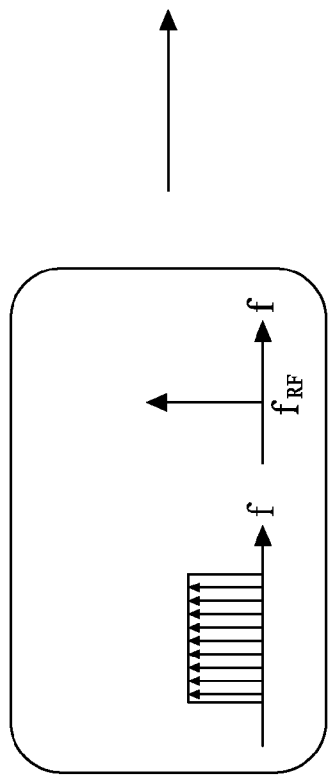
Figure 8:
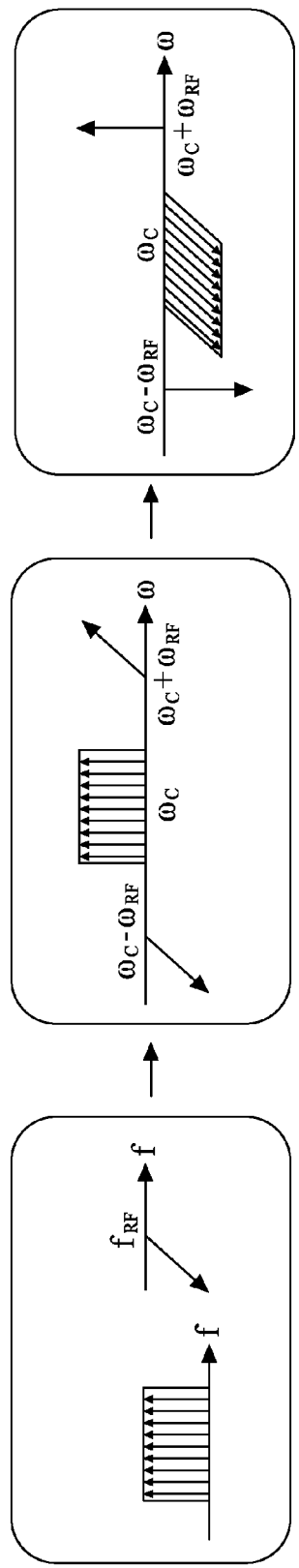
Figure 9:
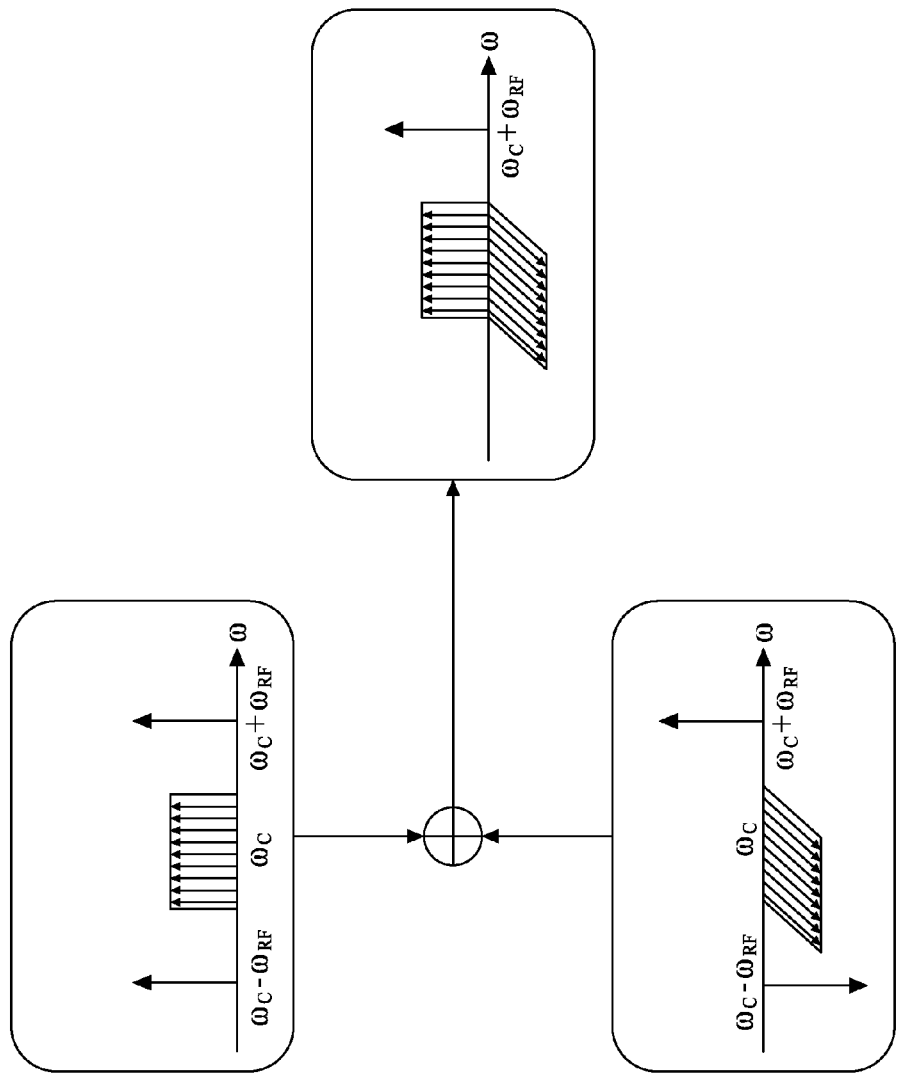

FIG. 7 to FIG. 9 illustrate the spectrum variation of the signal-transmitting system 100 according to one embodiment of the disclosure. Referring to FIG. 7, in one embodiment of the disclosure, the first electrical carrier ($f_{RF}$) and the electrical signals are coupled to the first electrode 26 of the optical modulator 20 by the first electrical coupler 32 to modulate the first optical carrier propagating in the first optical waveguide 22 under the first electrode 26 to form the first modulation wave. In one embodiment of the disclosure, the optical modulator 20 is biased at a predetermined voltage (Vπ) such that the first optical carrier ($\omega_C$) is eliminated while the first electrical carrier ($\omega_{RF}$) is modulated to the two sides from the first optical carrier ($\omega_C$) by a frequency $f_{RF}$, i.e., the first modulation wave including a right sideband ($\omega_C+\omega_{RF}$) and a left sideband ($\omega_C-\omega_{RF}$). In addition, in one embodiment of the disclosure, the electrical analog signals stay in the baseband such that the bandwidth of the DAC 104 can be adequately used rather than being divided into two parts. Furthermore, the electrical analog signals stay in the baseband such that the complexity for processing the electrical analog signals is dramatically decreased.

Referring to FIG. 8, in one embodiment of the disclosure, the electrical shifter 18 shifts the phase of the second electrical carrier ($f_{RF}$) by 90 degrees, and the second electrical carrier ($f_{RF}$) is then coupled to the second electrode 28 of the optical coupler 20 by the second electrical coupler 34 to modulate the second optical carrier propagating in the second optical waveguide 24 under the second electrode 28 to form the second modulation wave. In one embodiment of the disclosure, the optical modulator 20 is biased at a predetermined voltage (Vπ) such that the second optical carrier ($\omega_C$) is eliminated while the second electrical carrier ($\omega_{RF}$) is modulated to the two sides from the second optical carrier ($\omega_C$) by a frequency $f_{RF}$, i.e., the second modulation wave including a right sideband ($\omega_C+\omega_{RF}$) and a left sideband ($\omega_C-\omega_{RF}$). Subsequently, in one embodiment of the disclosure, the optical phase shifter 36 shifts the second modulation wave by a predetermined phase such that the left sideband ($\omega_C-\omega_{RF}$) and the right sideband ($\omega_C+\omega_{RF}$) have the opposite phase.

Referring to FIG. 9, in one embodiment of the disclosure, the optical coupler 38 is configured to couple the first modulation wave and the second modulation wave to form an optical output signal 106. In one embodiment of the disclosure, the left sideband ($\omega_C-\omega_{RF}$) of the first modulation wave and the left sideband ($\omega_C-\omega_{RF}$) of the second modulation wave have the opposite phase such that the destructive interference occurs and the two left sidebands eliminate each other; in contrast, the right sideband ($\omega_C+\omega_{RF}$) of the first modulation wave and the right sideband ($\omega_C+\omega_{RF}$) of the second modulation wave have the same phase such that the constructive interference occurs to form the reference optical carrier 40. In addition, in one embodiment of the disclosure, the electrical analog signals stay in the baseband such that the bandwidth of the DAC 104 can be adequately used rather than being divided into two parts. Furthermore, the electrical analog signals stay in the baseband such that the complexity for processing the electrical analog signals is dramatically decreased.

In summary, one embodiment of the disclosure discloses a new up-conversion technique, which modulates the electrical analog signals in the baseband and uses an electrical carrier to generate the virtual reference optical carrier by the single sideband optical modulation mechanism. Consequently, the electrical carrier does not pass through the DAC, and the electrical analog signals can use the entire bandwidth of the DAC. In addition, the electrical carrier and the electrical analog signals are coupled to the optical modulator by the electrical coupler without using the electrical mixer. Furthermore, the ratio of the power between the optical reference carrier and the electrical analog signal can be adjusted individually to optimize the power efficiency by adjusting the power of the electrical carrier.

Although the disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps.

We claim:

1. A signal-transmitting system, comprising:
a digital-to-analog converter configured to convert digital data into an electrical analog signal;
an optical modulator including a first optical waveguide configured to transmit a first optical carrier, a second optical waveguide configured to transmit a second optical carrier, a first electrode positioned on the first optical waveguide, and a second electrode positioned on the second optical waveguide;
a first electrical coupler configured to couple the electrical analog signal and a first electrical carrier to the first electrode to generate a first modulation wave;
a second electrical coupler configured to couple the electrical analog signal and a second electrical carrier to the second electrode to generate a second modulation wave, the phase of the first electrical carrier being different from the phase of the second electrical carrier by a predetermined phase difference;
an optical phase shifter configured to shift the second modulation wave by a predetermined phase;
an optical coupler configured to couple the first modulation wave and the second modulation wave to generate an optical output signal; and
an electrical phase shifter modulating the second modulation wave modulated by the optical phase shifter such that a left sideband of the first modulation wave and a left sideband of the second modulation wave have the opposite phase and eliminate each other due to the destructive interference.

2. The signal-transmitting system of claim 1, further comprising:
an electrical wave generator configured to generate the first electrical carrier and the second electrical carrier; and
an electrical phase shifter configured to shift the phase of the second electrical wave by 90 degrees.

3. The signal-transmitting system of claim 1, further comprising:
an optical wave generator configured to generate an optical wave; and
an optical splitter configured to split the optical wave into the first optical carrier and the second optical carrier.

4. The signal-transmitting system of claim 3, wherein the optical modulator comprises a substrate, and the optical splitter is a Y-shaped waveguide in the substrate.

5. The signal-transmitting system of claim 1, wherein the optical modulator comprises a substrate, and the optical coupler is a Y-shaped waveguide in the substrate.

6. The signal-transmitting system of claim 1, wherein the optical coupler is biased at Vπ.

7. The signal-transmitting system of claim 1, wherein the predetermined phase difference between the first electrical carrier and the second electrical carrier is 90 degrees.

8. The signal-transmitting system of claim 1, wherein the optical phase shifter is a third electrode positioned on the second optical waveguide.

9. The signal-transmitting system of claim 1, wherein the frequency of the first optical carrier is $\omega_C$, the frequency of the first electrical carrier is $\omega_{RF}$, and the optical modulator, the optical phase shifter and the electrical shifter are configured to generate a reference carrier with a frequency of $\omega_C+\omega_{RF}$.

10. The signal-transmitting system of claim 1, wherein the optical modulator is a double-sideband modulator.

11. The method for transmitting signals of claim 1, wherein the frequency of the first optical carrier is $\omega_C$, the frequency of the first electrical carrier is $\omega_{RF}$, the optical modulator, and the optical output signal includes a reference carrier with a frequency of $\omega_C + \omega_{RF}$.

12. A method for transmitting signals, comprising the steps of:
   converting digital data into an electrical analog signal;
   providing an optical modulator including a first optical waveguide configured to transmit a first optical carrier, a second optical waveguide configured to transmit a second optical carrier, a first electrode positioned on the first optical waveguide, and a second electrode positioned on the second optical waveguide;
   coupling the electrical analog signal and a first electrical carrier to the first electrode to generate a first modulation wave;
   coupling the electrical analog signal and a second electrical carrier to the second electrode to generate a second modulation wave, the phase of the first electrical carrier being different from the phase of the second electrical carrier by a predetermined phase difference;
   biasing the second modulation wave to allow the second modulation wave to have a left sideband and a right sideband, wherein the left sideband and the right sideband have the opposite phase;
   shifting the second modulation wave by a predetermined phase such that a left sideband of the first modulation wave and the left sideband of the second modulation wave have the opposite phase and eliminate each other due to the destructive interference; and
   coupling the first modulation wave and the second modulation wave to generate an optical output signal.

13. The method for transmitting signals of claim 12, further comprising the steps of:
   generating the first electrical carrier and the second electrical carrier; and
   shifting the phase of the second electrical wave by 90 degrees.

14. The method for transmitting signals of claim 12, further comprising the steps of:
   generating an optical wave; and
   splitting the optical wave into the first optical carrier and the second optical carrier.

15. The method for transmitting signals of claim 14, wherein the step of splitting the optical wave into the first optical carrier and the second optical carrier is performed by using a Y-shaped waveguide.

16. The method for transmitting signals of claim 12, wherein the step of coupling the first modulation wave and the second modulation wave to generate an optical output signal is performed by using a Y-shaped waveguide.

17. The method for transmitting signals of claim 12, further comprising a step of biasing the optical coupler at $V\pi$.

18. The method for transmitting signals of claim 12, wherein the predetermined phase difference between the first electrical carrier and the second electrical carrier is 90 degrees.

19. The method for transmitting signals of claim 12, wherein the step of shifting the second modulation wave by a predetermined phase is performed by using a third electrode positioned on the second optical waveguide.

20. The method for transmitting signals of claim 12, wherein the optical modulator is a double-sideband modulator.

* * * * *